Figure 1:
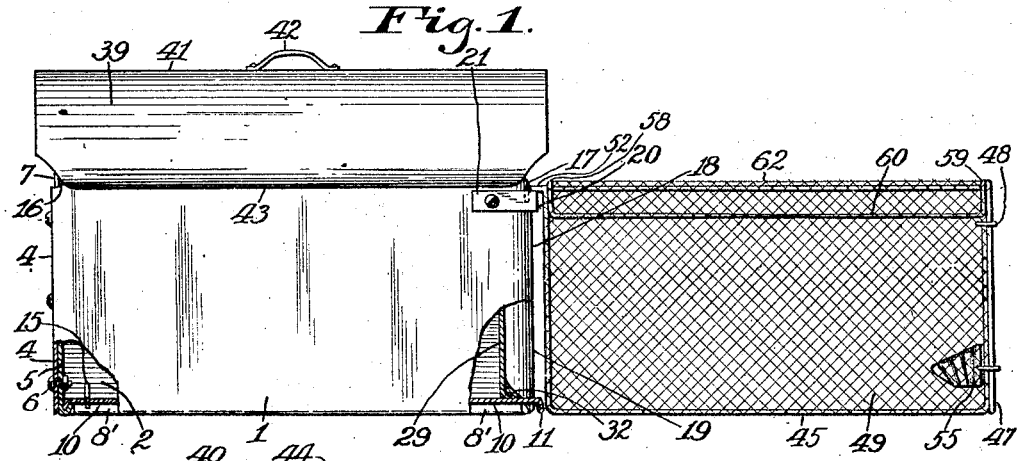

April 13, 1926.

J. Q. CLARKE 1,581,082

COLLAPSIBLE CHICKEN COOP AND YARD

Filed Nov. 13, 1922    2 Sheets-Sheet 1

INVENTOR:
John Q. Clarke,
BY E. T. Silvius,
ATTORNEY.

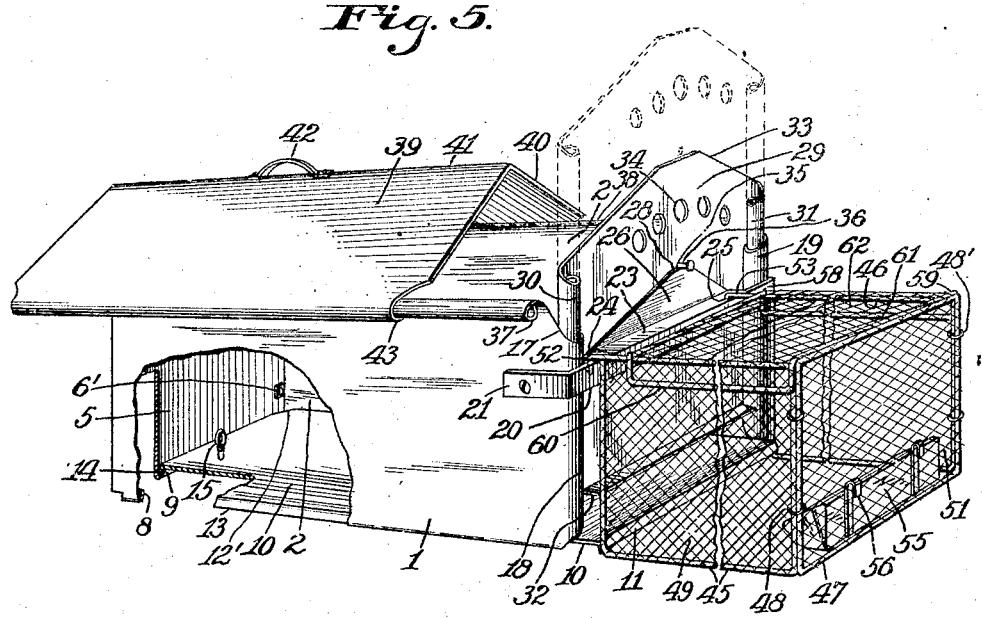
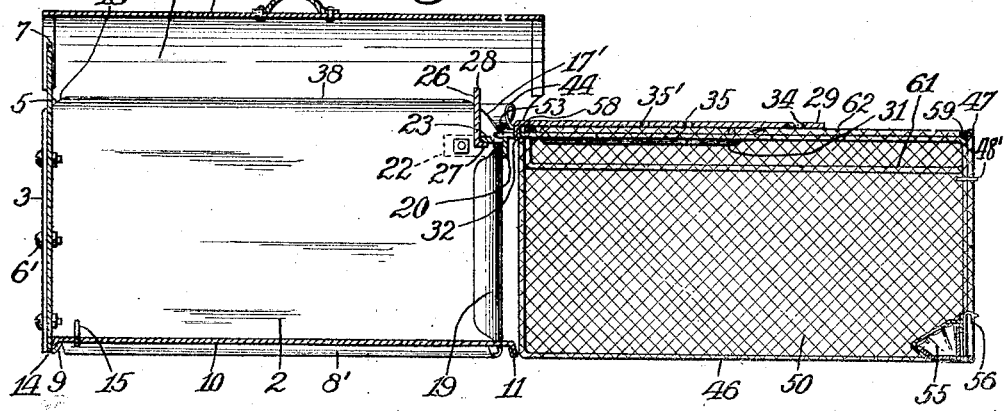

Patented Apr. 13, 1926.

1,581,082

UNITED STATES PATENT OFFICE.

JOHN Q. CLARKE, OF CRAWFORDSVILLE, INDIANA, ASSIGNOR TO J. Q. CLARKE TANK CO., OF CRAWFORDSVILLE, INDIANA, A CORPORATION OF INDIANA.

COLLAPSIBLE CHICKEN COOP AND YARD.

Application filed November 13, 1922. Serial No. 600,717.

*To all whom it may concern:*

Be it known that I, JOHN Q. CLARKE, a citizen of the United States, residing at Crawfordsville, in the county of Montgomery and State of Indiana, have invented a new and useful Collapsible Chicken Coop and Yard, of which the following is a specification, reference being had to the accompanying drawings and to the letters and figures of reference marked thereon.

This invention relates to a chicken coop of a type that comprises a closed sheltering part and a latticed part or yard, the invention having reference more particularly to a collapsible chicken coop and yard, adapted especially for the use of hens when hatching and for the care of little chickens.

An object of the invention is to provide a chicken coop which shall be of such construction as to combine a closed protecting coop or house adapted for the convenience and protection of a sitting hen, and a sunlighted and airy part in which the young chickens may run with safety and in which they may be fed.

Another object is to provide an improved chicken coop which shall be so constructed as to permit it to be readily cleansed and kept in sanitary condition, and which shall be adapted to prevent the escape of chickens therefrom while cleansing the coop.

A further object is to provide a collapsible metallic chicken coop and yard of such construction as to require few and simple parts in the manufacture thereof, and which may be cheaply packed in small compass for shipment to the best advantage in knocked-down arrangement, or so packed for storage by the user between hatching seasons.

A still further object is to provide an improved chicken coop and yard which shall be so constructed as to permit only the young chickens to have the range of the coop and yard when desired or to confine them in either the coop or the yard, and separately from the hen if desired, an aim being to provide a structure of the above-mentioned character which shall afford the maximum protection to chickens in different sorts of weather conditions, and which shall be durable and economical in use.

With the above-mentioned and other objects in view, the invention consists in a coop having a removable floor or bottom and an adjustable and removable end wall and an adjustable and removable roof, the walls of the coop being detachably connected together, and a latticed or open-work part or yard detachably connected to the coop and adapted to be covered or partially covered by the removable end of the coop; and, the invention consists also further in the novel parts, and in the combinations and arrangements of parts, as hereinafter particularly described and further defined in the claims appended hereto.

Figure 2:
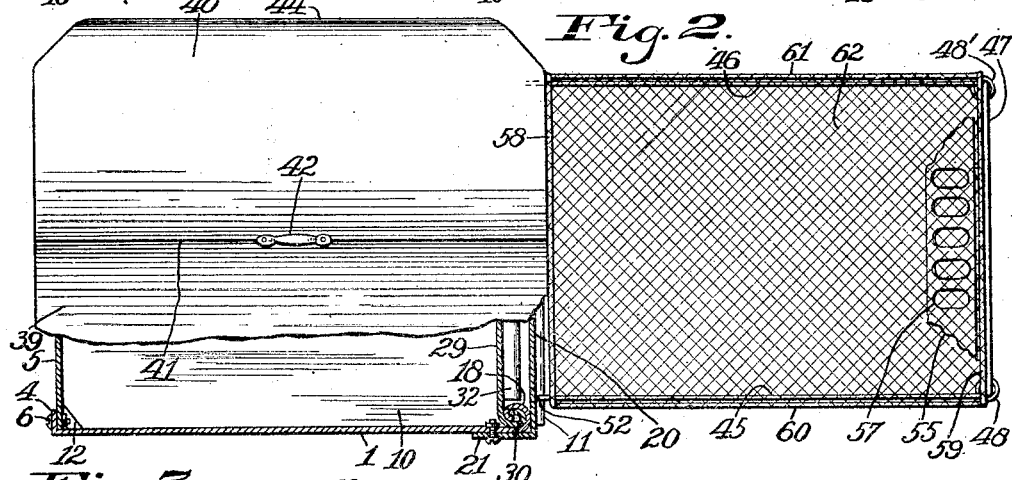
Figure 3:
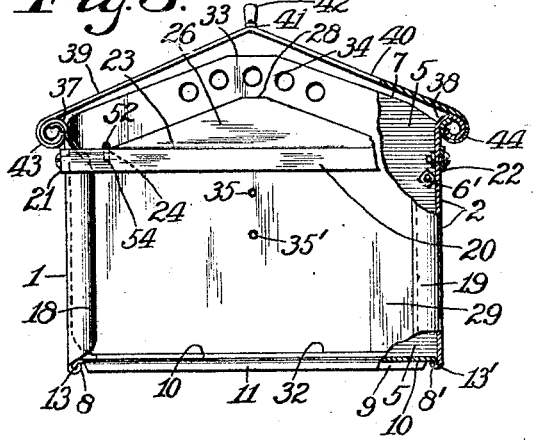
Figure 4:
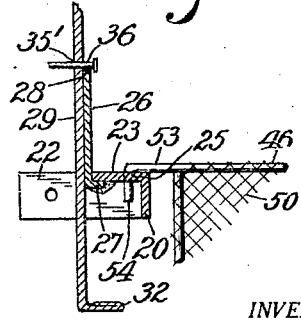

Referring to the drawings,—Figure 1 is a side elevation of the chicken coop and yard, portions being broken away to show details of the structure; Fig. 2 is a top plan of the coop and yard, portions being shown as a horizontal section; Fig. 3 is an end elevation of the chicken coop minus the yard part thereof, portions being broken away to show details of structure; Fig. 4 is a fragmentary vertical central section on an enlarged scale longitudinally of the structure; Fig. 5 is a perspective view of the coop and yard partially broken away, parts of the structure being adjusted to different positions; and, Fig. 6 is a longitudinal vertical central section of the coop and yard, parts of the structure being in relatively different positions.

Similar reference characters in the different figures of the drawings indicate like parts or features of construction herein referred to in detail.

The coop or house part of the invention as preferably constructed is composed of galvanized sheet iron and comprises two side walls 1 and 2 oppositely arranged and having corner flanges 3 and 4 that extend each toward the other, and a rear-end wall 5 arranged against the flanges and secured thereto by means of bolts 6, 6', the end wall being taller than the side walls and having an approximately arch-shaped top 7. The side walls have base members 8 and 8' respectively formed by turning the metal inwardly and upwardly and the end wall has a similar base member 9, and the base members removably support a floor or bottom 10 composed of sheet metal, the bottom extending forward beyond the side walls and preferably having a downward extending lip 11 on its forward end. The rearward end of the floor has obtuse-angled corners 12 and 12' designed to clear the bolts 6 and 6' when the floor is lifted. The floor preferably has downward extending lips 13 and 13' that interlock with the base members 8 and 8' to prevent the side walls from spreading, the floor having also a similar lip 14 interlocked with the base member 9 to retain the floor in position against the end wall 5. The floor is provided on its top adjacent to the end wall 5 with a suitable lifting eye 15. The upper portion of one side wall has beveled end portions 16 and 17 and the opposite wall has similar portions 16' and 17', such beveled ends rendering operations easy when connecting the roof of the house to the side walls, as will hereinafter appear. The forward ends of the side walls have hollow vertical guides 18 and 19 on the inner side thereof composed of portions of the metal rolled over simply and inexpensively, the guides being adapted to perform the function of guide posts.

The forward end of the house is provided with a cross-bar 20 that is horizontally arranged at a suitable height above the floor and against the guide or gate posts, being provided with right-angled end members 21 and 22 that are arranged against the outer side of the walls 1 and 2 and are suitably secured thereto, so as to perform the function of a tie-bar and a frame member, the cross-bar having a horizontal wing 23 thereon that is provided with socket holes 24 and 25 adjacent to the guides or posts 18 and 19 respectively. An end plate 26 is arranged with one edge 27 in connection with the wing 23, integrally or otherwise, and it has a top edge 28 corresponding approximately to the top 7 of the opposite end wall 5. A gate 29 is arranged against the inner side of the plate 26 and performs the function of an end wall and a partition between the two parts of the coop. The gate is provided on its vertical edges with guide members 30 and 31 composed preferably of rolled-over portions of the metal of the gate and so as to slide longitudinally into the posts 18 and 19 respectively, the lower edge of the gate preferably having an outwardly extending flange 32 that normally rests on the floor 10. The gate extends upward beyond the end plate 26 and has an approximately arch-shaped top 33 which preferably is of a height corresponding to that of the top 7. Preferably the gate has a suitable number of ventilating apertures 34 adjacent to the top thereof and higher than the top 28, and the gate has also pin-holes 35 and 35' arranged at different levels to receive a pin 36 which may rest upon the top 28 of the end plate when the gate is raised adjustably.

For the purpose of advantageously providing the house part of the coop with an adjustable roof by which the house part may be lifted and carried, the upper portions of the side walls 1 and 2 are provided with horizontal guides 37 and 38 respectively, the guides being slightly shorter than the walls and preferably are composed of portions of the wall plates rolled-over outwardly. A sheet metal roof is provided which has two sides 39 and 40 and a central ridge 41 to which a handle 42 is secured. The lower portions of the sides of the roof are provided with guide members 43 and 44 respectively that are interlocked with the guides 37 and 38 respectively but permit sliding movement of the roof, the guide members preferably being composed of portions of the metal rolled over and under the plates and so as to extend nearly around the guides on the walls. The roof is so set as to clear the tops 7 and 33 to afford ventilation openings under the roof, the roof being longer than the side walls so as to project beyond them and prevent the entrance of rain or snow at the top of the end wall parts.

The yard or latticed part of the coop comprises two rectangular side wall frames 45 and 46 composed of wire and a rectangular end wall frame 47 arranged at one end of the side wall frames and connected thereto by means of rings 48 and 48', so that the two side wall frames are hingedly connected to the end wall frame. The openings in the side wall frames are spanned by lattice-work 49 and 50 composed of wire netting or woven wire fencing connected to the frames, and lattice-work or fencing 51 is likewise connected to the end frame. One end of the yard structure being open, the ends of the side walls are arranged adjacent to the crossbar 20 and the gate posts 18 and 19, to afford free communication between the house part and the yard part when the end gate 29 is elevated or removed, and the upper portions of the side frames 45 and 46 are provided with projecting coupling rods 52 and 53 having each a finger 54 thereon, the fingers being removably inserted in the socket holes 24 and 25 respectively. A feed box 55 is removably connected to the lower portions of the lattice-work 51, the feed box preferably having hooks 56 engaging the fencing wires. The feed box top has apertures 57 therein through which the young chickens may obtain food. The yard part has no bottom but rests upon the ground, permitting the young chickens to indulge their scratching propensities. The yard part has a removable latticed cover which comprises two main rods 58 and 59 that extend against the top of the side wall frames, and two side frame members 60 and 61 that are connected to the main rods and extend downward at the outside of the fencing 49 and 50 respectively, the frame of the cover having lattice-work or woven wire 62 connected thereto. The cover prevents the chickens from flying out of the yard and also protects them against attacks by birds or animals.

The various parts of the coop and yard may be readily packed at the factory for shipment by placing the separate parts in superimposed order so as to be compact, and not being hollow the package is not liable to become crushed and damaged in transit, requiring only simple and inexpensive crating or tying of the parts together. The purchaser may readily assemble the various parts and connect them together without requiring the use of tools, or a wrench at most.

In practical use the structure is placed upon the ground and may be readily carried from place to place when desired, especially when new scratching ground and vegetation are desired for the chickens. A nest may be made on the floor 10, and the gate 29 being closed a sitting hen will not be disturbed or interfered with but may be periodically permitted to leave the house when the end gate is elevated and the pin 36 is placed in the hole 35', the yard part not being connected to the house part; or one side wall frame of the yard part may be connected in place while the other side wall frame is disconnected and moved inward towards the connected side wall frame, permitting the hen to pass outside the disconnected side wall of the yard part. After the chickens are hatched and need a runway, the end gate 29 is elevated slightly, as in Fig. 5 and the pin 36 is placed in the pin hole 35, permitting the young chickens to pass into the yard while restraining the hen. The roof of the house part may be moved forward or rearward to permit the interior of the coop to be cleansed, and the hen and young chickens may be driven into the yard and kept there by closing the end gate while the floor 10 is lifted and the interior of the coop thoroughly cleansed. When it is desired to permit the hen and chickens to remain in the house part or to come into the yard and scratch, the gate 29 may be removed from place and placed front downward upon the cover of the yard, as in Fig. 6 to shield the chickens from hot sun rays or from rain, and the roof may be drawn forward so as to partially cover the protecting gate part. When necessary to catch the little chickens in the yard or to chase them into the house part the cover of the yard part may be readily lifted sufficiently to gain access to the chickens.

Having thus described the invention, what is claimed as new is:—

1. A chicken coop and yard including a house part with an open end, a cross-bar secured to the upper portion of the house part and extending across the open end, the cross-bar having sockets therein, an end gate adjustably arranged at one side of the cross-bar, and a yard part arranged on the opposite side of the cross-bar and having couplers on its upper portion removably connected with the sockets in the cross-bar.

2. A chicken coop and yard including a sectional house part having two oppositely arranged side walls provided each with a hollow vertical guide on the inner side at one end thereof, an end wall secured to the opposite ends of the side walls, a cross-bar arranged adjacent to the upper portions of the vertical guides and having members secured to the side walls respectively, a yard part removably connected to the cross-bar, and an end gate arranged at the inner side of the cross-bar and having guide members slidably arranged in the vertical guides.

3. A chicken coop including two side walls having each a vertical guide on the inner side at one end thereof, an end wall removably secured fixedly to the opposite ends of the side walls, a cross-bar having members secured to the upper portions of the side walls adjacent to the upper portions of the vertical guides, the cross-bar having an end plate fixed thereto and extending upward, an end gate arranged at the inner side of the end plate and having guide members slidably arranged in connection with the vertical guides, a roof comprising oppositely inclined sides slidably connected to the side walls respectively and normally extending over the end gate, and a handle secured to the higher portion of the roof.

4. A chicken coop including two side walls having each a vertical guide on the inner side at one end thereof, the bottom of each side wall having an inwardly and upwardly extending base member, a cross-bar connected to the side walls adjacent to the tops of the vertical guides, an end wall detachably secured to the opposite ends of the side walls, a floor removably supported upon the base members and having downwardly extending lips engaging the backs of the base members, the floor having a lifting eye adjacent to the end wall, an end gate arranged at the inner side of the cross-bar and having guide members slidably arranged in connection with the vertical guides, and a roof slidably connected to the side walls and normally extending over the end gate.

5. A chicken coop including two side walls having each a vertical guide on the inner side at one end thereof, the opposite end of each side wall having a flange extending each towards the other flange, base members fixed on the bottom portions of the side walls respectively and extending inwardly and upwardly, an end wall detachably secured to said flanges and having a base member on the lower portion thereof extending inwardly and upwardly, a floor removably supported upon all the base members and having lips on its side and rear edges extending downward and engaging the backs of the base members respectively, the forward end of the floor having a downwardly extending lip thereon, a cross-bar secured to the side walls adjacent to the tops of the vertical guides and having an upward extending end plate fixed thereto, an end gate at the inner side of said end plate and having guide members on the outer side thereof slidably connected with the vertical guides respectively, and a roof removably connected to the side walls.

6. In a chicken coop and yard, the combination of two oppositely arranged side walls having each a hollow vertical guide on the inner side at one end and a flange on the inner side at the opposite end thereof, an end wall removably secured to said flanges, a cross-bar arranged adjacent to the upper portions of the vertical guides and having angle members secured to the side walls respectively, the cross-bar having an end plate fixed thereto and extending upward and having also socket holes in the top thereof in proximity to said vertical guides, two rectangular side frames having each a projecting coupler on one end of the upper portion thereof removably connected with said socket holes, a rectangular end frame hingedly connected to the opposite ends of the side frames, lattice-work connected to the side frames and the end frame respectively, a cover frame removably connected to the tops of the side frames, lattice-work connected to the cover frame, horizontal guides fixed on the upper portions of the side walls respectively, a roof having guide members slidably connected with the horizontal guides respectively, an end gate arranged at the inner side of said end plate and having guide members slidably arranged in said vertical guides, and means to adjustably support the end gate on said end plate.

7. In a chicken coop and yard, the combination of two oppositely arranged side walls having each a hollow vertical guide on the inner side at one end thereof, an end wall secured to the opposite ends of the side walls, a cross-bar arranged adjacent to the upper portions of the vertical guides and having angle members secured to the side walls respectively, the cross-bar having an end plate fixed thereto and extending upward between said guides, an end gate arranged at the inner side of said end plate and having guide members slidably arranged in the vertical guides, the gate having pin-holes therein, and a stop pin to rest upon said end plate and extend into one of said pin-holes.

8. In a chicken coop and yard, the combination of two rectangular side frames having each a projecting coupler on one end of the upper portion thereof for engagement with a house structure, a rectangular end frame arranged at the opposite ends of the side frames, hinging rings connecting the side frames respectively with the end frame, lattice-work connected to the side frames respectively, lattice-work connected to the end frame, a cover frame removably arranged upon the tops of the side frames and extending downwards against the outer sides thereof, and lattice-work connected to the cover frame.

In testimony whereof, I affix my signature on the 6th day of November 1922.

JOHN Q. CLARKE.